United States Patent
Kelly et al.

(10) Patent No.: US 11,455,532 B2
(45) Date of Patent: Sep. 27, 2022

(54) SINGLE POINT FACILITY UTILITY SENSING FOR MONITORING WELFARE OF A FACILITY OCCUPANT

(71) Applicant: Optum Services (Ireland) Limited, Dublin (IE)

(72) Inventors: Damian Kelly, Kilcock (IE); Ronan McCormack, Dublin (IE); Peter Ross, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 380 days.

(21) Appl. No.: 16/822,520

(22) Filed: Mar. 18, 2020

(65) Prior Publication Data
US 2021/0295147 A1 Sep. 23, 2021

(51) Int. Cl.
| | | |
|---|---|---|
| G06N 3/08 | (2006.01) | |
| G06K 9/62 | (2022.01) | |
| G01D 4/00 | (2006.01) | |
| G06F 9/30 | (2018.01) | |

(52) U.S. Cl.
CPC .............. *G06N 3/08* (2013.01); *G01D 4/002* (2013.01); *G06F 9/30036* (2013.01); *G06K 9/6259* (2013.01); *G06K 9/6269* (2013.01)

(58) Field of Classification Search
CPC ...... G06N 3/08; G01D 4/002; G06F 9/30036; G06K 9/6259; G06K 9/6269
See application file for complete search history.

(56) References Cited

U.S. PATENT DOCUMENTS

| | | | | |
|---|---|---|---|---|
| 9,851,230 | B2* | 12/2017 | Gestner | G01N 29/024 |
| 11,334,036 | B2* | 5/2022 | Yang | G06N 3/08 |
| 2015/0180894 | A1* | 6/2015 | Sadovsky | H04W 12/12 |
| | | | | 726/22 |
| 2017/0298597 | A1 | 10/2017 | Hammond et al. | |
| 2020/0371491 | A1* | 11/2020 | Wong | G05B 13/04 |
| 2021/0043058 | A1* | 2/2021 | Williams | G06N 3/0454 |
| 2021/0247483 | A1* | 8/2021 | Wang | G01S 13/56 |
| 2022/0159403 | A1* | 5/2022 | Sporer | H04R 3/005 |

OTHER PUBLICATIONS

Carboni, Davide, et al. "Contextualising water use in residential settings: A survey of non-intrusive techniques and approaches." Sensors 16.5 (2016): 738. (Year: 2016).*

(Continued)

*Primary Examiner* — Utpal D Shah
(74) *Attorney, Agent, or Firm* — Alston & Bird LLP

(57) ABSTRACT

The utility usage of a particular individual occupying a residence may give insight into the individual's current cognitive health and/or to enable provision of various services within the facility for the individual, particularly when monitoring patterns in utility usage over time. To enable accurate and non-invasive utility monitoring, a single-point utility sensor may be secured relative to a utility supply line, and generated signals may be utilized to monitor utility usage and to distinguish between utility fixtures. A centralized computing entity may identify frequency characteristics within the generated data, and may automatically generate one or more machine-learning algorithms to distinguish between utility usage events, without requiring substantial user input.

19 Claims, 10 Drawing Sheets

Offline Phase
(Day 0 and periodically):

Online Phase
(real-time windowed execution):

(56) References Cited

OTHER PUBLICATIONS

Nguyen, Khoi A., Rodney A. Stewart, and Hong Zhang. "Water end-use classification with contemporaneous water-energy data and deep learning network." International Journal of Computer and Systems Engineering 12.1 (2017): 1-6. (Year: 2017).*
"Water Leak Detection & Fixture Level Monitoring Technology by Phyn," (9 pages), [online], [retrieved from the Internet Mar. 20, 2020] <https://www.phyn.com/technology/?gclid=CjwKCAiA8ejuBRAaEiwAn-J3gbkB_9_oUBsMeU2RG4YbnKYez7FcD91HZxgUipdZk6_DvRDVKVx9RoCCLsQAvD_BwE>.
Akl, Ahmad et al. "Unobtrusive Detection of Mild Cognitive Impairment in Older Adults Through Home Monitoring," IEEE Journal of Biomedical and Health Informatics, vol. 21, No. 2, pp. 339-348, Mar. 2017. DOI: 10.1109/JBHI.2015.2512273.
Alcala, Jose M. et al. "Assessing Human Activity In Elderly People Using Non-Intrusive Load Monitoring," Sensors, vol. 17, No. 2, pp. 1-17, Feb. 11, 2017, pp. 1-17. DOI: 10.3390/s17020351.
Fogarty, James et al. "Sensing From The Basement: A Feasibility Study Of Unobtrusive and Low-Cost Home Activity Recognition," InProceedings of the 19th Annual ACM Symposium On User Interface Software and Technology, Oct. 15, 2006, pp. pp. 91-100.
Guralnik, Valery et al. "Event Detection From Time Series Data," InProceedings of the Fifth ACM SIGKDD International Conference On Knowledge Discovery and Data Mining, Aug. 1, 1999, pp. 33-42.
Jebb, Andrew T. et al. "Time Series Analysis For Psychological Research—Examining and Forecasting Change," Frontiers In Psychology, Jun. 9, 2015, vol. 6, No. 727, pp. 1-24. DOI: 10.3389/fpsyg.2015.00727.
Kalantarian, Haik et al. "Monitoring Eating Habits Using A Piezoelectric Sensor-Based Necklace," Computers In Biology and Medicine, vol. 58, (2015), pp. 46-55.
Madokoro, Hirokazu. "Piezoelectric Sensors Used For Daily Life Monitoring," Organic and Inorganic Materials and Applications, Aug. 19, 2018, pp. 103-123.
Natta, Lara et al. "Soft and Flexible Piezoelectric Smart Patch For Vascular Graft Monitoring Based On Aluminum Nitride Thin Film," Scientific Reports, vol. 9, Article No. 8392, Jun. 10, 2019, pp. 1-10. DOI: 10.1038/S41598-019-44784-1.
Ueno, Hitoshi. "A Piezoelectric Sensor Signal Analysis Method for Identifying Persons Groups," Sensors, vol. 19, No. 3, 733, Feb. 12, 2019, (12 pages). DOI: 10.3390/s19030733.

* cited by examiner

SINGLE POINT FACILITY UTILITY SENSING FOR MONITORING WELFARE OF A FACILITY OCCUPANT

BACKGROUND

Individuals have a natural desire to live independently for as long as possible. However, as individuals age, it can become more difficult for those individuals to recognize if or when they need medical assistance. For example, without regular human interaction that is generally provided as a result of healthcare services, it may be difficult for individuals to determine whether their cognitive ability is declining over time.

In an effort to enable individuals to maintain their independence, in-home sensors having a limited effectiveness have been provided for certain individuals. These sensors, such as "shake" sensors that may be placed on individual cabinet doors, camera-based sensors that may be placed in one or more rooms within an individual's home, and/or the like, are often described as a hinderance to everyday life for individuals, as cabinet shake sensors must be installed on each individual cabinet door, and those sensors must be checked periodically to ensure proper functionality. Camera-based sensors have been indicated as privacy-intrusive on those individuals, as the cameras are capable of obtaining information/data well-beyond that necessary to determine whether the individual is medically safe. Moreover, these sensors (e.g., cabinet shake sensors and cameras) have a very limited effectiveness, as they are incapable of monitoring the individual if that individual does not touch the cabinets on which the shake sensors are installed, or the individual does not enter the field of view of the camera.

Accordingly, a need exists for configurations for sensors having a wide overall effectiveness in monitoring individuals while maintaining a high degree of privacy for those individuals.

BRIEF SUMMARY

Various embodiments are directed to single-point sensing configurations encompassing a single sensor capable of monitoring the usage of a related utility (e.g., water usage, sewage usage, electricity usage, and/or the like) of a facility via a single-point sensor secured relative to a utility supply line and configured to detect characteristics of the utility supply line (e.g., vibrations within a fluid supply line, changes in current within an electrical supply line, and/or the like) that may be correlated to usage of specific fixtures, such as faucets, devices, and/or the like, within the facility. The single-point sensor provides raw data to an analytic computing entity via a network, and the analytic computing entity is configured to identify discrete utility usage events within the raw data via one or more machine-learning-based detection configurations, and to identify changes in utility usage that may be indicative of a cognitive decline of a resident of the facility via one or more additional machine-learning-based monitoring configurations.

Various embodiments are directed to a system for detecting utility usage and distinguishing between utility fixtures within a facility, the system comprising: at least one utility sensor secured to a utility supply line of a facility, wherein the at least one utility sensor is configured to generate time-series data based at least in part on detected utility usage; and an analytic computing entity in network communication with the at least one utility sensor, wherein the analytic computing entity comprises one or more memory storage areas and one or more processors collectively configured to: transform at least a portion of the time-series data generated by the at least one utility sensor into converted data in a frequency domain; compress the converted data into vector form via a neural network compression algorithm; detect discrete utility usage events within the vector form utilizing an event detection algorithm; cluster discrete utility usage events to generate labels for detected utility usage events; and train one or more machine-learning classifier algorithms based at least in part on clustered discrete utility usage events to classify utility usage events by a plurality of fixtures.

In certain embodiments, the at least one utility sensor is embodied as a single point fluid sensor secured to an exterior surface of a fluid supply line for the facility. Moreover, in various embodiments, the single point fluid sensor is embodied as a piezoelectric sensor. In certain embodiments, the analytic computing entity is configured to change between an event detector training configuration and an event detection configuration, and wherein: the event detector training configuration comprises processes for: transforming the at least a portion of the time-series data generated by the at least one utility sensor into the converted data in the frequency domain; compressing the converted data into vector form via the neural network compression algorithm; detecting the discrete utility usage events within the vector form utilizing the event detection algorithm; generating a clustering algorithm to cluster discrete utility usage events and to generate labels for detected utility usage events; and training the one or more machine-learning classifier algorithms based at least in part on the clustered discrete utility usage events to classify and distinguish between utility usage by the plurality of fixtures; and the event detection configuration comprises processes for: transforming at least a portion of second time-series data generated by the at least one utility sensor into second converted data in the frequency domain; applying the neural-network compression algorithm to compress the second converted data into vector form; detecting discrete utility usage events within the vector form utilizing the event detection algorithm; and applying the clustering algorithm and the one or more machine-learning classifier algorithms to classify and distinguish between utility usage by the plurality of fixtures.

In certain embodiments, the one or more processors are further configured to train a machine-learning algorithm for monitoring fixture usage events over time and to detect deviations in fixture usage. Moreover, in various embodiments, the at least one utility sensor is embodied as a single point electric current sensor secured in-line with a facility electricity supply line. In certain embodiments, transforming at least a portion of the time-series data generated by the at least one utility sensor into converted data in a frequency domain comprises: generating a spectrogram based at least in part on the converted data; and smoothing the spectrogram utilizing a smoothing algorithm.

In various embodiments, a computer-implemented method for detecting utility usage and distinguishing between utility fixtures within a facility is provided, the method comprising: receiving, via at least one processor, time-series data generated based at least in part on utility usage detected by at least one utility sensor secured to a utility line of a facility; transforming, via the at least one processor, at least a portion of the time-series data generated by the at least one utility sensor into converted data in a frequency domain; compressing, via the at least one processor, the converted data into vector form via a neural network compression algorithm; detecting, via the at least one processor, discrete utility usage events within the vector form utilizing an event detection algorithm; clustering, via the at least one processor, discrete utility usage events to generate labels for detected utility usage events; and training, via the at least one processor, one or more machine-learning classifier algorithms based at least in part on clustered discrete utility usage events to classify utility usage events by a plurality of fixtures.

Moreover, the at least one utility sensor may be embodied as a piezoelectric single point fluid sensor secured to an exterior surface of a fluid supply line for the facility. In certain embodiments, the method may further comprise changing between an event detector training configuration and an event detection configuration, and wherein: the event detector training configuration comprises processes for: transforming the at least a portion of the time-series data generated by the at least one utility sensor into the converted data in the frequency domain; compressing the converted data into vector form via the neural network compression algorithm; detecting the discrete utility usage events within the vector form utilizing the event detection algorithm; and generating a clustering algorithm to cluster discrete utility usage events and to generate labels for detected utility usage events; and training the one or more machine-learning classifier algorithms based at least in part on the clustered discrete utility usage events to classify and distinguish between utility usage by the plurality of fixtures; and the event detection configuration comprises processes for: transforming at least a portion of second time-series data generated by the at least one utility sensor into second converted data in the frequency domain; applying the neural-network compression algorithm to compress the second converted data into vector form; detecting discrete utility usage events within the vector form utilizing the event detection algorithm; and applying the clustering algorithm and the one or more machine-learning classifier algorithms to classify and distinguish between utility usage by the plurality of fixtures.

In certain embodiments, the method further comprises training a machine-learning algorithm for monitoring fixture usage events over time and to detect deviations in fixture usage. In various embodiments, the at least one utility sensor is embodied as a single point electric current sensor secured in-line with a facility electricity supply line. In certain embodiments, transforming at least a portion of the time-series data generated by the at least one utility sensor into converted data in a frequency domain comprises: generating a spectrogram based at least in part on the converted data; and smoothing the spectrogram utilizing a smoothing algorithm.

Certain embodiments are directed to a computer program product comprising a non-transitory computer readable medium having computer program instructions stored therein, the computer program instructions when executed by a processor, cause the processor to: receive time-series data generated based at least in part on utility usage detected by at least one utility sensor secured to a utility line of a facility; transform at least a portion of the time-series data generated by the at least one utility sensor into converted data in a frequency domain; compress the converted data into vector form via a neural network compression algorithm; detect discrete utility usage events within the vector form utilizing an event detection algorithm; cluster discrete utility usage events to generate labels for detected utility usage events; and train one or more machine-learning classifier algorithms based at least in part on clustered discrete utility usage events to classify utility usage events by a plurality of fixtures.

In various embodiments, the at least one utility sensor is embodied as a piezoelectric single point fluid sensor secured to an exterior surface of a fluid supply line for the facility. Moreover, the computer program product may further comprise computer program instructions configured to cause the processor to change between an event detector training configuration and an event detection configuration, and wherein: the event detector training configuration comprises processes for: transforming the at least a portion of the time-series data generated by the at least one utility sensor into the converted data in the frequency domain; compressing the converted data into vector form via the neural network compression algorithm; detecting the discrete utility usage events within the vector form utilizing the event detection algorithm; and generating a clustering algorithm to cluster discrete utility usage events and to generate labels for detected utility usage events; and training the one or more machine-learning classifier algorithms based at least in part on the clustered discrete utility usage events to classify and distinguish between utility usage by the plurality of fixtures; and the event detection configuration comprises processes for: transforming at least a portion of second time-series data generated by the at least one utility sensor into second converted data in the frequency domain; applying the neural-network compression algorithm to compress the second converted data into vector form; detecting discrete utility usage events within the vector form utilizing the event detection algorithm; and applying the clustering algorithm and the one or more machine-learning classifier algorithms to classify and distinguish between utility usage by the plurality of fixtures.

Moreover, the computer program product may further comprise computer program instructions configured to cause the processor to train a machine-learning algorithm for monitoring fixture usage events over time and to detect deviations in fixture usage. In certain embodiments, the at least one utility sensor is embodied as a single point electric current sensor secured in-line with a facility electricity supply line. Moreover, transforming at least a portion of the time-series data generated by the at least one utility sensor into converted data in a frequency domain may comprise: generating a spectrogram based at least in part on the converted data; and smoothing the spectrogram utilizing a smoothing algorithm.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
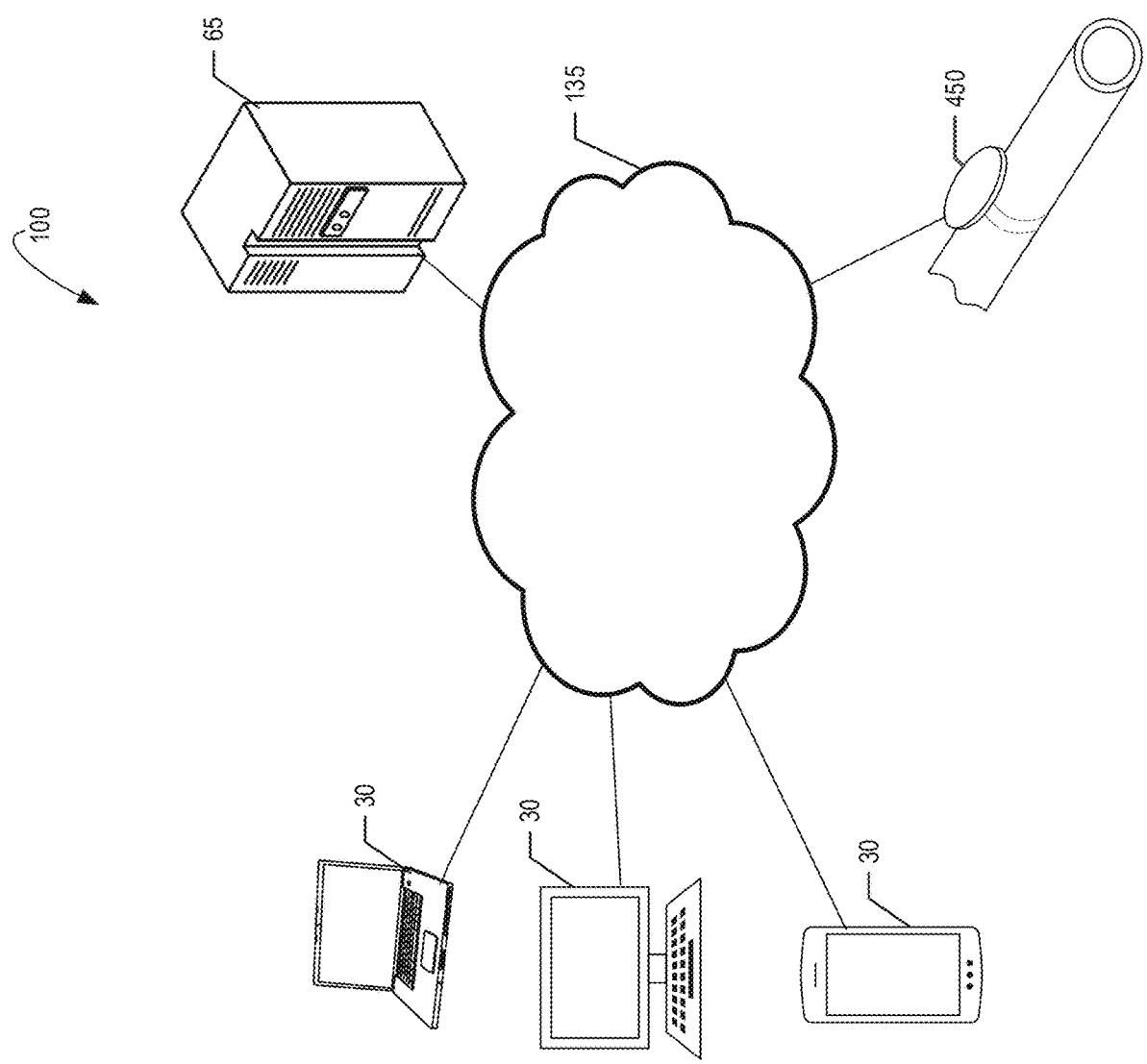
FIG. 1 is a diagram of a compression system that can be used in conjunction with various embodiments of the present invention.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a compression system 100 that can be used in conjunction with various embodiments of the present invention. As shown in FIG. 1, the compression system 100 may comprise one or more analytic computing entities 65, one or more user computing entities 30, one or more utility sensors 450, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Analytic Computing Entity

Figure 2:
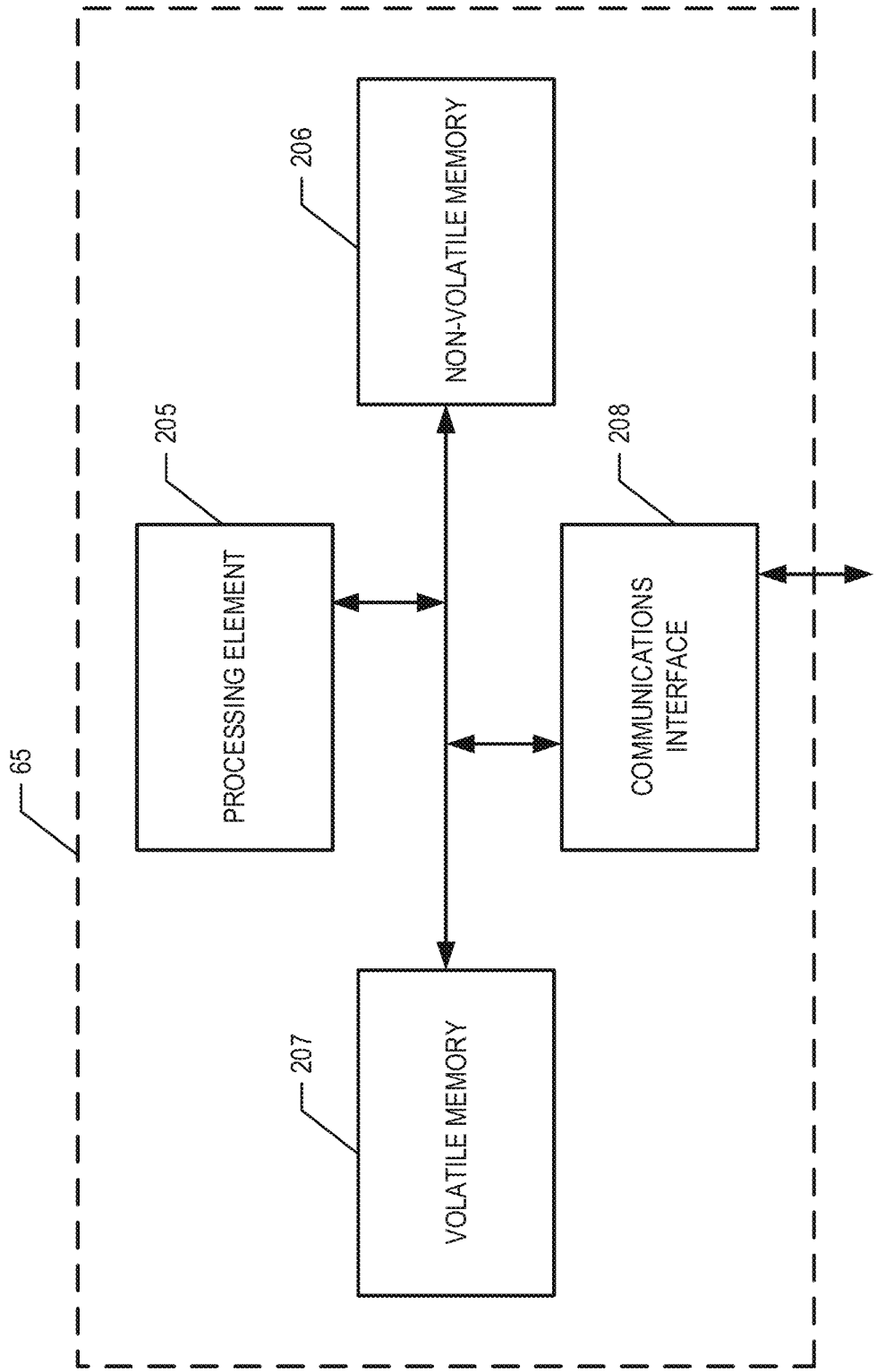
FIG. 2 is a schematic of an analytic computing entity in accordance with certain embodiments of the present invention.

FIG. 2 provides a schematic of an analytic computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with other computing entities 65, one or more user computing entities 30, and/or the like.

As shown in FIG. 2, in one embodiment, the analytic computing entity 65 may include or be in communication with one or more processing elements 205 (also referred to as processors, processing circuitry, and/or similar terms used herein interchangeably) that communicate with other elements within the analytic computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analytic computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the compression system may be stored. As a person of ordinary skill in the art would recognize, the information/data required for the operation of the compression system may also be partially stored in the cloud data storage system and partially stored in a locally maintained data storage system.

Memory media 206 may include information/data accessed and stored by the analytic computing entity, such as raw data, compressed data, and/or executable data (e.g., comprising one or more modules utilized to compress the raw data into the compressed data) to facilitate the operations of the system. More specifically, memory media 206 may encompass one or more data stores configured to store information/data usable in certain embodiments.

In one embodiment, the analytic computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 65 with the assistance of the processing element 205 and operating system.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with computing entities or communication interfaces of other computing entities 65, user computing entities 30, and/or the like.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the analytic computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other analytic computing entity 65 components, such as in a distributed system. Furthermore, one or more of the components may be aggregated and additional components performing functions described herein may be included in the analytic computing entity 65. Thus, the analytic computing entity 65 can be adapted to accommodate a variety of needs and circumstances.

b. Exemplary User Computing Entity

Figure 3:
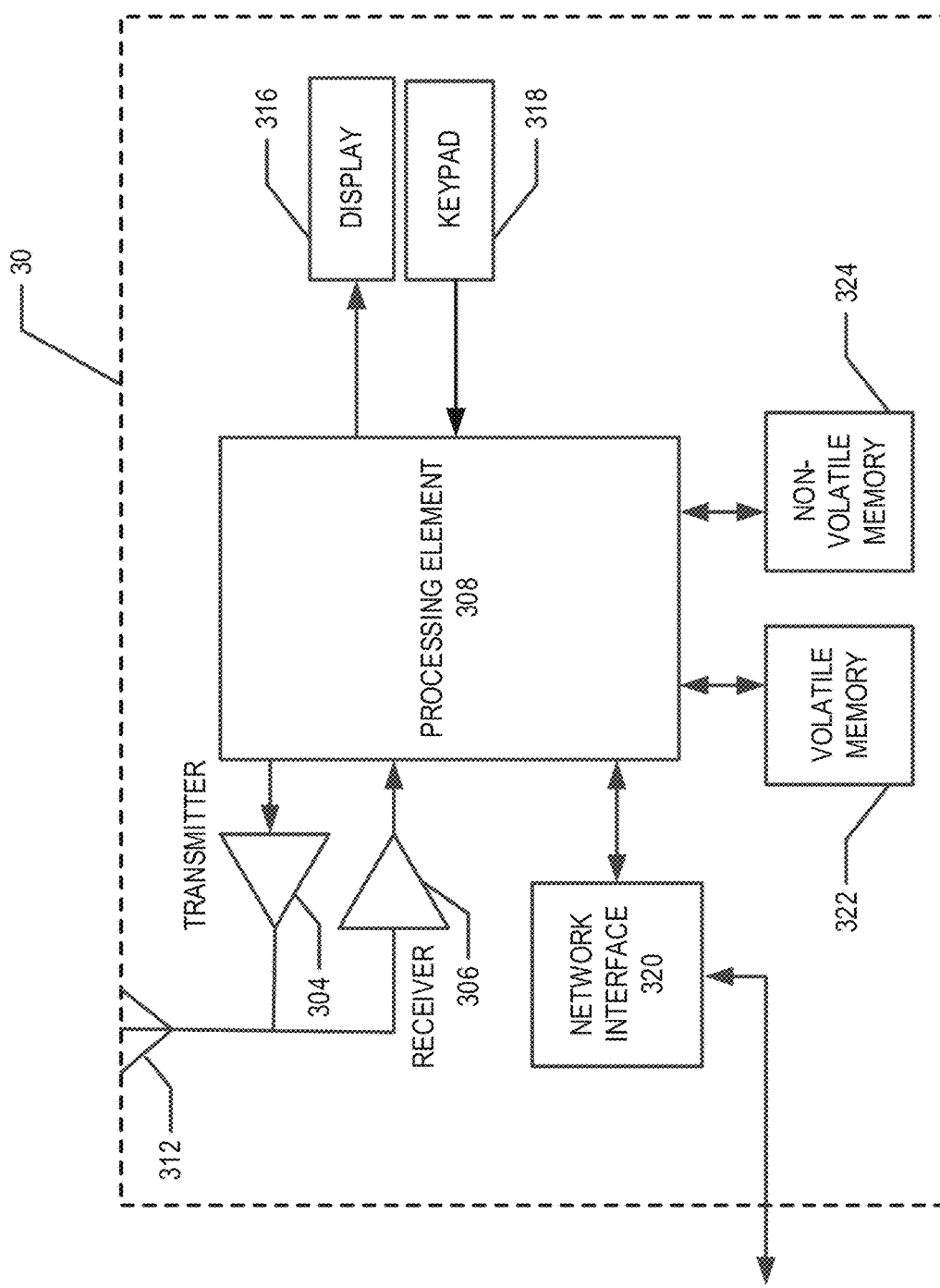
FIG. 3 is a schematic of a user computing entity in accordance with certain embodiments of the present invention.

FIG. 3 provides an illustrative schematic representative of a user computing entity 30 that can be used in conjunction with embodiments of the present invention. As will be recognized, the user computing entity may be operated by an agent and include components and features similar to those described in conjunction with the analytic computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an analytic computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the analytic computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Sensors

Example sensors in accordance with various embodiments are configured for monitoring utility usage within a facility (e.g., a building, such as a residence, a business, a unit of a building, such as an apartment, a condo, and/or the like). As just one example, such sensors may be configured to monitor water usage within a facility. As another example, such sensors may be configured for monitoring electricity usage. As yet another example, such sensors may be configured for monitoring natural gas (or other heating fuel, such as oil usage) usage. Other examples may include detecting network bandwidth usage by particular devices (e.g., by detecting signal signatures of network usage of particular devices); detecting hot/cold air from a central ventilation unit of a facility (e.g., by detecting vibrations within one or more ducts of a centralized ventilation system attached with a heater and/or air conditioner); detecting vibrations within a frame of a facility (e.g., within wall frame studs, floor joists, ceiling stringers, and/or the like of a facility). It should be understood that other utilities and/or other characteristics may be monitored in accordance with various embodiments as discussed herein.

Sensors configured for monitoring usage of a fluid, such as water usage sensors, may comprise piezoelectric sensors configured to detect vibrations within a fluid supply line (e.g., a fluid supply pipe, such as a water supply pipe). Piezoelectric sensors may be particularly suitable for avoiding interference from external sources of vibrations, sounds, and/or the like, as such sensors may be specifically configured to monitor vibrations of an adjacent supply line, such as a water supply line on which the sensor is secured. As an additional example, such sensors may comprise a microphone configured to detect sound-vibrations within a fluid supply line (e.g., a fluid supply pipe, such as a water supply pipe).

An example fluid sensor may be disposed on (e.g., secured directly to) an exterior surface of a fluid supply line (e.g., via one or more fastening mechanisms) such that the sensors detect fluid flow changes within the fluid supply line without contact with the fluid flowing through the fluid supply line. As just one example, a piezoelectric sensor may be secured onto an outer surface of a fluid supply line via one or more clamps (e.g., hook-and-loop fasteners, a screw-based clamp, an adhesive-based clamp, and/or the like). The piezoelectric sensor may be secured with a sensing surface against (e.g., in contact with) the exterior surface of the fluid supply line, such that a piezoelectric sensing element within the piezoelectric sensor remains sensitive to variations in fluid flow within the fluid supply line that cause the walls of the fluid supply line to vibrate (e.g., vibrations within the fluid supply line caused by changes in the fluid flow within the fluid supply line) with minimal interference from vibrations originating external to the fluid supply line.

The piezoelectric sensor may generate signals that may be amplified (e.g., via an onboard or separate amplifier). These amplified signals may be generated as analog signals that may be converted to digital signals (e.g., via an analog-to-digital converter) prior to being provided to the analytic computing entity 65 as discussed herein for further analysis. It should be understood that signals from the piezoelectric sensor (or other single-point utility monitoring sensor) directly or indirectly (e.g., the signals may be passed through one or more intermediary computing entities prior to being provided to the analytic computing entity 65).

In certain embodiments, a single fluid supply sensor may be utilized for a facility, with the single fluid supply sensor located proximate inlet of the fluid supply line for the facility (e.g., proximate the location where the fluid supply line connects with a main supply line, for example, of a street, a larger building, and/or the like). Because the single supply line for the facility provides fluid to all fluid fixtures within the facility (e.g., the main water supply line for the facility provides water to all sinks, water-based appliances, toilets, showers, baths, hose-bibs, and/or the like), vibrations within the fluid supply line caused by fluid flow through any of the fixtures of the facility may cause vibrations within the main water supply line of the facility. Moreover, because each fixture has unique fixture characteristics (e.g., flowrates, nozzle types, activation times, and/or the like), each fixture creates a unique vibration signature through the water supply lines of the facility, including at the main water supply line. Accordingly, placing a single sensor at a main water supply line of the facility may detect the unique vibration signatures of all fixtures within the facility. As just one specific illustrative example with reference to FIG. 4, an upstairs sink 401C may generate a first vibration signature within a main fluid supply line for a facility 400 when activated, while the upstairs shower 401A may generate a unique second vibration signature within a main fluid supply line. Other fixtures such as those illustrated in FIG. 4 (e.g., washer 401D, upstairs toilet 401B, dishwasher 401F, kitchen sink 401G, refrigerator water dispenser 401E, and/or the like) may each generate their own respective unique vibrations signatures within the main fluid supply line of the facility 400, thereby enabling embodiments as discussed herein to distinguish between activation events of each fixture within the facility 400. Such vibration signatures may be characterized by differences in frequency, differences in length of activation, patterns of changing frequencies, and/or the like.

In other embodiments, multiple fluid supply sensors may be utilized, for example, a first fluid supply sensor positioned on an exterior of a cold-water supply line, a second fluid supply sensor positioned on an exterior of a hot-water supply line (e.g., downstream of a hot-water heater), and/or a third fluid sensor positioned on a waste water line (e.g., a sewage line) for the facility. Each of the plurality of water supply sensors may be configured to detect a different one or more fixtures, or each of the plurality of water supply sensors may operate in concert, for example, to detect a combined vibration signature of the usage of fixtures (e.g., detecting a signature of a fixture's cold-water usage, a signature of the same fixture's hot-water usage, and a signature of the same fixture's waste water generation). The combination of the multiple vibration signatures may collectively define a combined signature for a single fixture.

Although the foregoing description focuses on monitoring usage of water within a facility, it should be understood that similar concepts may be utilized for monitoring the usage of other fluids supplied within a facility, such as natural gas supplying one or more heaters, one or more stoves, one or more ovens, and/or the like, within the facility.

Sensors configured for monitoring electrical usage may comprise current monitoring sensors positioned in-line with an input line of an electrical supply line of a facility. These current monitoring sensors may be positioned within a fuse-box for a facility and/or upstream of a fuse-box for a facility. In other embodiments, a single current monitoring sensor may be provided for each of the variety of fuses within the fuse-box (thereby individually monitoring each circuit within the facility), so as to monitor current characteristics generated as a result of activating/using devices connected within each individual circuit. It should be understood that methodologies as discussed herein with respect to water usage may be applied to electricity usage, with an understanding that differences in feature extraction processes as discussed herein may be applied so as to identify electrical events of interest (e.g., for sensing reactive power, sensing active power, detecting differences in power consumption activities, and/or the like).

d. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. OVERVIEW

As discussed herein, various embodiments are directed to a facility sensing system configured for monitoring usage characteristics of a corresponding utility. The sensing and/or monitoring of utility usage within a facility may provide insight into a resident/occupant of the facility's activities over time. Such insight may be useful, for example, for monitoring the resident/occupant's cognitive health and/or to enable provision of activity-specific healthcare services (e.g., by providing reminders, notifications, and/or the like upon the detection of a particular event) within the facility for the resident/occupant. As a specific example, a facility sensing system may be embodied as a fluid-usage sensing system (e.g., a water usage sensing system, a gas usage sensing system, and/or the like) configured to monitor usage of a fluid within a facility. As another specific example, a facility sensing system may be embodied as an electricity usage sensing system configured to monitor usage of electricity within a facility.

The facility sensing system of certain embodiments comprises a single-point sensor configured to monitor corresponding utility usage for the facility (e.g., the entire facility or a portion of a facility associated with a single circuit of a multi-circuit fuse-box) and to detect utility usage corresponding with one or more fixtures, such as faucets, appliances, and/or other devices configured to consume utilities. As an example, a fluid sensor of a fluid-usage sensing system may be embodied as a piezoelectric sensor secured onto an exterior surface of a fluid supply line of a facility and may be configured to detect vibrations within the fluid supply line attributable to usage by one or more fixtures, such as faucets, appliances, devices, and/or the like. An electric current sensor of an electricity usage sensing system may be configured to detect changes in current usage within a single circuit (or a plurality of circuits) that may be attributable to usage by one or more fixtures, such as appliances, devices, and/or the like.

Raw data collected by the utility sensors associated with a facility are provided to an analytic computing entity configured to generate, via machine-learning, device identification configurations for distinguishing between usage by various devices within the facility (e.g., by attributing specific vibration signatures detected within the fluid supply line for the facility to specific fixtures, such as faucets, appliances, and/or devices). The analytic computing entity 65 may be further configured to generate one or more machine-learning configurations for identifying changes in utility usage within a facility (and/or attributable to a particular individual residing within the facility), so as to provide a data proxy that may be indicative of changes in mental state of one or more individuals residing within the facility.

A. Technical Problem

At present, sensing technologies for monitoring the cognitive and/or medical characteristics of an individual living independently within a facility requires complex and intrusive combinations of various sensing technologies, such as shake sensors that are installed on individual cabinet doors, cameras installed within individual rooms, fall sensors that are kept on the individual's person (e.g., on a wrist, a necklace, and/or the like), and/or the like. Because each individual sensor has a relatively limited range of capability for detecting characteristics of an individual (e.g., a camera cannot provide any data regarding the individual if that person is not located within the field of view of the camera; shake sensors on cabinet doors cannot provide any information about an individual if the individual does not open/ use the cabinet door, and/or the like), existing systems are characterized by relatively limited capabilities for monitoring individuals, or existing systems are characterized by highly intrusive combinations of various sensors, each generating different data types that require separate analysis to determine relevance. Moreover, by increasing the number and/or complexity of sensors associated with a single facility, the overall sensing system similarly increases in complexity, requiring increasingly complex maintenance and/or service to ensure proper functionality of the overall system (e.g., ensuring each sensor has adequate power, ensuring each sensor is appropriately placed, ensuring each sensor remains functional, and/or the like).

B. Technical Solution

To solve the foregoing technical problems, various embodiments utilize a single-point sensor for a facility to detect usage of a corresponding utility (e.g., a fluid sensor is configured to detect usage of a particular fluid-based utility, such as water usage, gas usage, or the like; an electrical current sensor is configured to detect usage of electricity within the facility; and/or the like). The sensor is configured to generate raw data indicative of usage of the corresponding facility, and to provide the raw data to an analytic computing entity configured for interpreting the raw data, for example, by training an unsupervised machine-learning based event detector that does not require complex setup and/or manual and time-intensive setup procedures, and for utilizing the trained machine-learning based event detector to detect (e.g., in real-time) various events occurring within the facility based on received raw data generated by the sensor. The detected events may then be utilized to determine whether event occurrences change over time (e.g., the frequency of events, the order of events, and/or the like), which may be indicative of changes in cognitive ability of the resident of the facility.

Accordingly, the cognitive and/or medical capability of a resident may be monitored with a minimally invasive, single-point sensor that minimally impacts the privacy of a resident/occupant of the facility and enables far-reaching monitoring of activities occurring within the facility without complex multi-sensor configurations that require complex setup and/or maintenance activities to maintain properly functional sensing capabilities. Furthermore, such sensors can provide relevant user context data to other ambient computing healthcare services such as smart reminders, provision of behavior change interactions in appropriate situations, initiating a session with a remote caregiver at appropriate times, and/or the like.

IV. EXEMPLARY SYSTEM OPERATION

Reference will now be made to FIGS. 4-10B to describe various embodiments, which illustrate various components of certain embodiments.

A. Raw Data Collection

Figure 4:
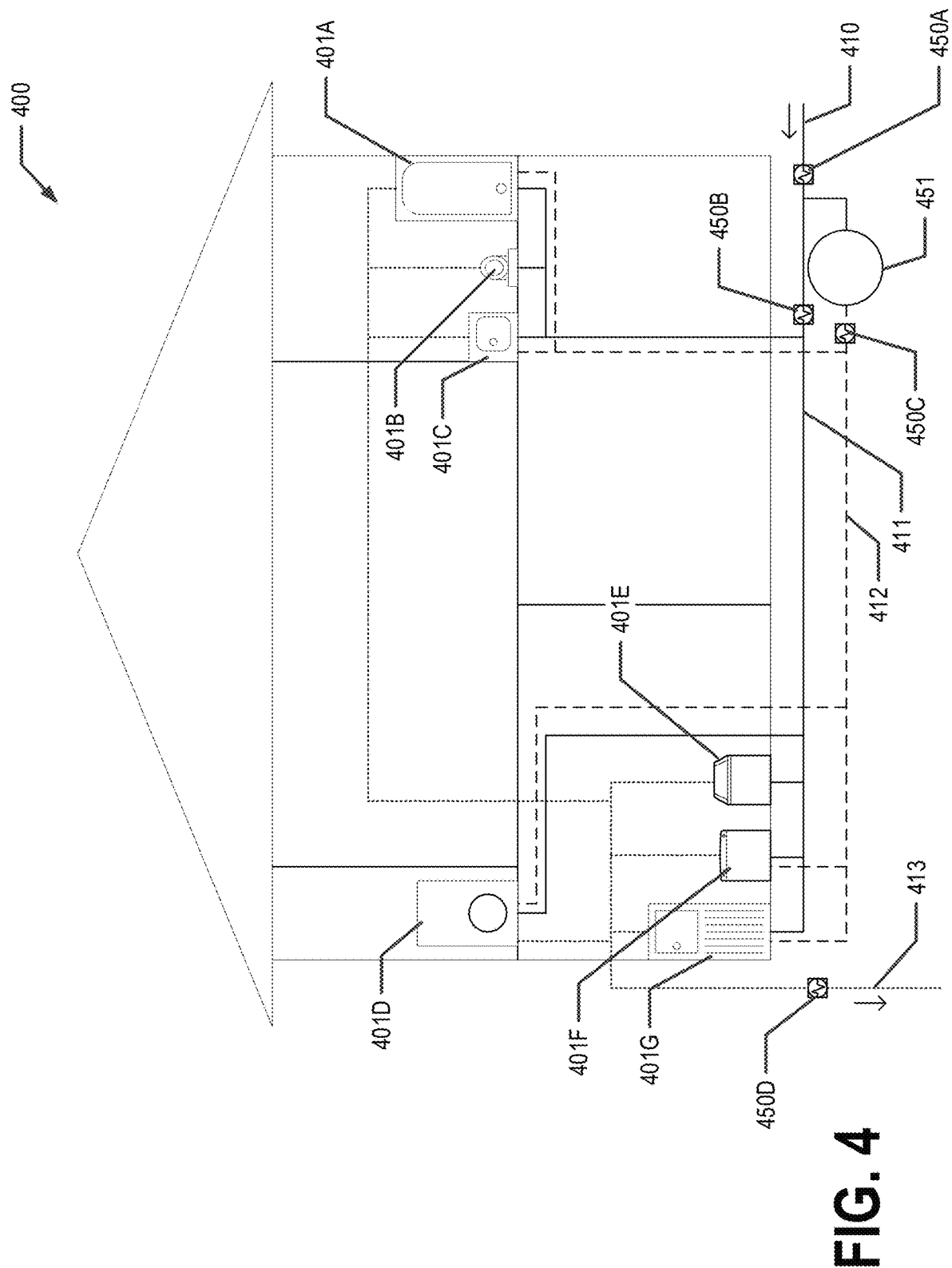
FIG. 4 is a schematic of a facility illustrating example placements of a utility sensor in accordance with various embodiments.
Figure 5:
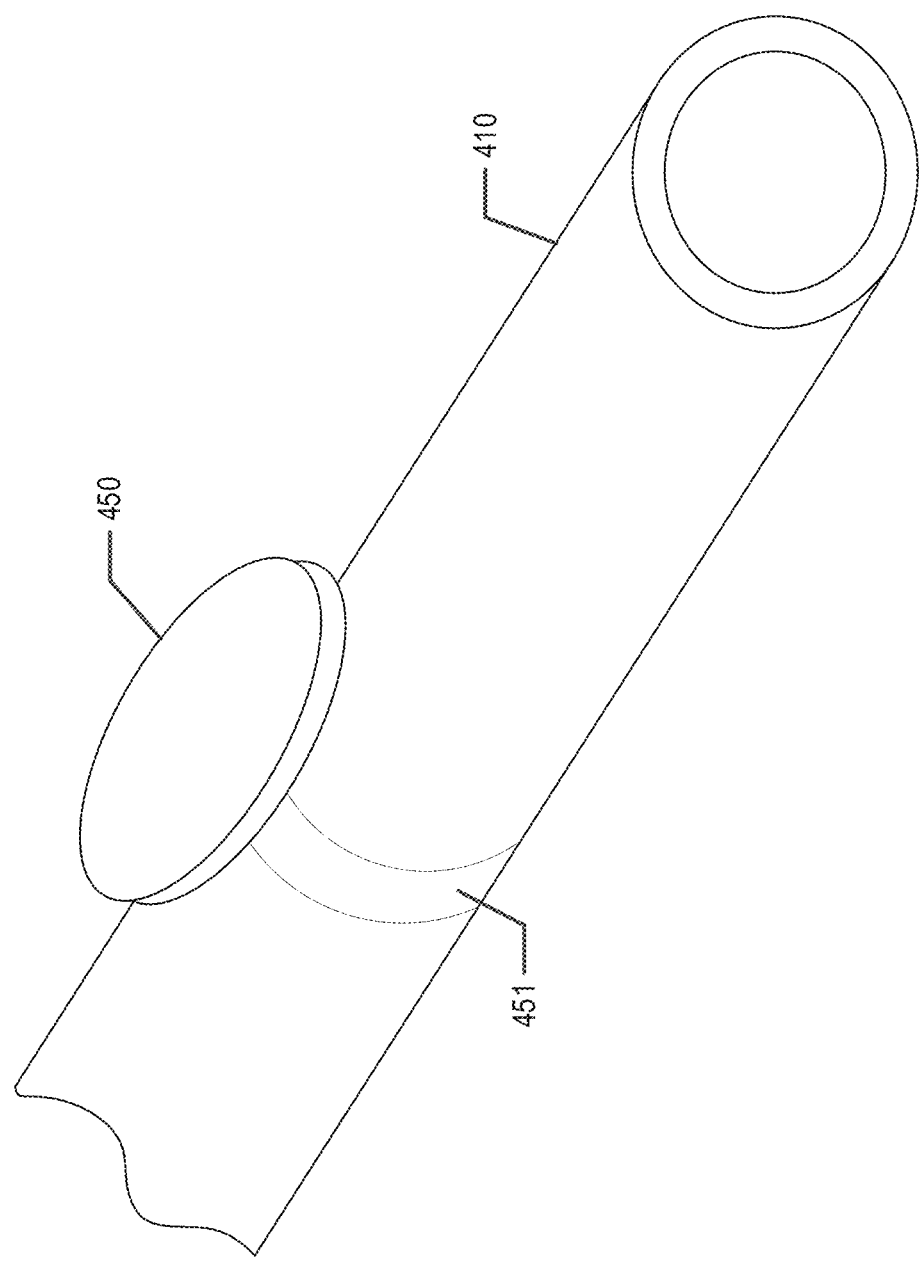
FIG. 5 is a schematic of a fluid supply line illustrating an example placement of a fluid sensor in accordance with one embodiment.

With reference specifically to the schematic illustrations of FIGS. 4-5, which illustrate example single-point sensor 450 placements relative to a facility 400, and example sensor attachments relative to a fluid supply line 410, respectively, various embodiments are configured for monitoring an individual residing and/or otherwise occupying a facility via a single-point sensor for the facility. FIG. 4 specifically provides an example facility implementing a fluid-sensing system for monitoring an individual residing and/or otherwise occupying a facility 400. Although the illustrated schematic shows the facility as an example residential single-family home, it should be understood that configurations as discussed herein may be provided for use with any of a variety of facility types (e.g., individual units of a condo, individual apartment units, individual rooms within a building, individual offices within a building, and/or the like).

As shown in FIG. 4, one or more fluid sensors (e.g., fluid sensors 450A-450D) may be provided for a facility on one or more fluid supply lines (e.g., fluid supply lines 410-413). For example, a single fluid sensor 450A may be provided via a main fluid supply line 410 for a facility 400 (e.g., a single fluid supply line providing fluid (e.g., water) for an entire facility 400), prior to the fluid supply line dividing into multiple lines (e.g., a hot water line 412 exiting a water heater 451 and a cold water line 411). In other embodiments, a single fluid sensor (e.g., fluid sensor 450B, fluid sensor 450C) may be provided on a water supply line (e.g., a cold water line 411 or a hot water line 412) such that only a portion of water provided to the facility 400 may be monitored. In other embodiments, a single fluid sensor 450D may be provided on a waste water line 413 to monitor the generation of waste water within a facility 400 (and vibration signatures that may be detectable within the waste water line 413 by fixtures).

FIG. 5 illustrates an example configuration for securing a fluid sensor 450 relative to a water supply line (e.g., fluid supply line 410) via a securing mechanism 451 (e.g., a clamp, hook-and-loop fasteners, adhesive, tape, and/or the like). As shown, the fluid sensor 450 may be secured relative to an exterior surface of the fluid supply line 410. Although not shown, the fluid sensor 450 may be additionally secured relative to a power supply (e.g., an onboard power supply such as an onboard battery, an external power supply such as an electrical source of the facility 400, and/or the like). Moreover, as reflected in FIG. 1, the fluid sensor 450 may be configured for network connectivity (e.g., wireless network connectivity) via a network of the facility 400. The network of the facility may enable the one or more fluid sensors 450 to connect with the analytic computing entity 65, so as to enable the fluid sensors 450 to provide raw time series data to the analytic computing entity 65 for further analysis.

Figure 6:
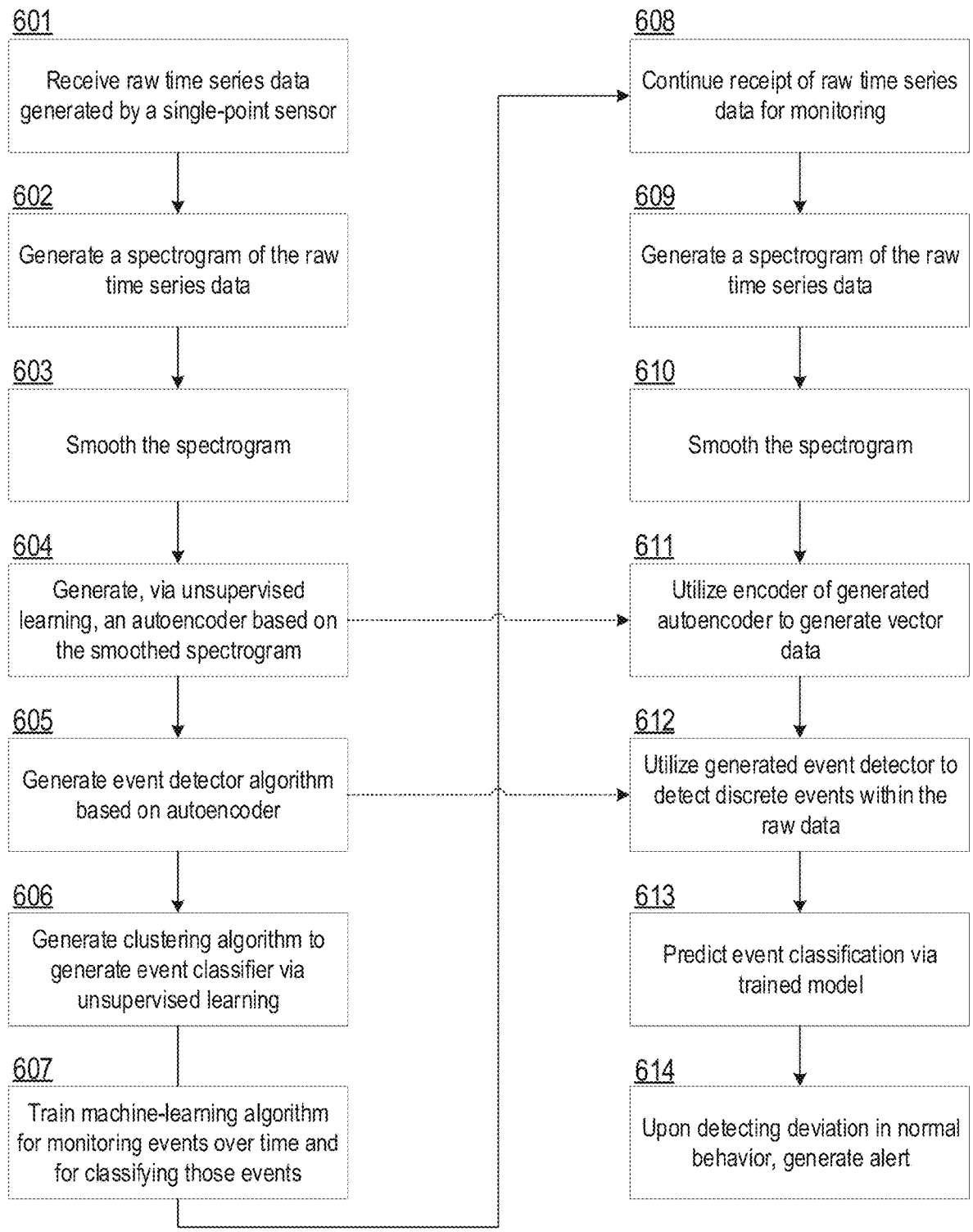
FIG. 6 is a flowchart illustrating various processes associated with monitoring utility usage in accordance with various embodiments.

With reference to FIG. 6, which illustrates a flowchart demonstrating various steps provided in accordance with certain embodiments, a single point fluid sensor 450 is configured to generate raw time series data, as illustrated at Block 601. As discussed in greater detail herein, the functionality of the fluid sensors 450 remain unchanged during data generation reflected by Block 601 during a training configuration (also referred to as an offline mode as reflected within the flowchart of FIG. 8) and data generation reflected by Block 608 during a monitoring configuration (also referred to as an online mode as reflected within the flowchart of FIG. 8), such that the fluid sensors 450 are configured for simply generating raw time series data. Analysis as discussed herein is performed at the analytic computing entity 65.

Figure 7:
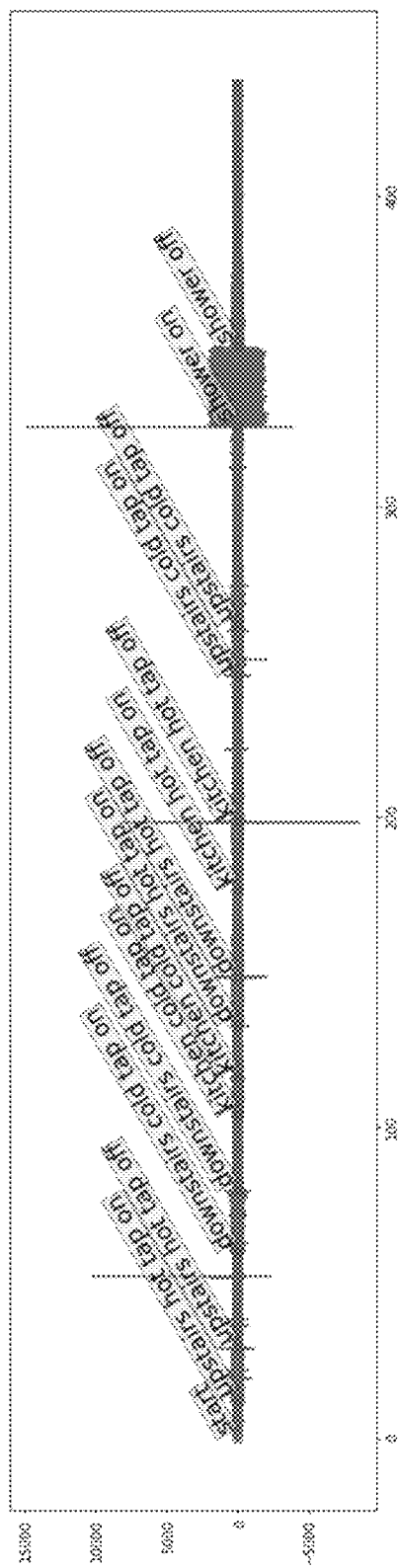
FIG. 7 is example raw time series data generated by a fluid sensor in accordance with one embodiment.

The one or more fluid sensors 450 are configured to provide the generated raw time series data to the analytic computing entity 65 (e.g., at least partially via wireless data transmission via a network) for analysis. FIG. 7 illustrates example raw time series data that may be generated by a single point fluid sensor 450 in accordance with an example embodiment. Although the illustration of FIG. 7 includes labels illustrating various events represented by the raw time series data, it should be understood that the raw time series data does not include such labels, which are provided based at least in part on various analysis processes as discussed herein, in addition to manual labelling to assign human-readable labels to particular events. As discussed herein, analytic processes as discussed herein and performed by the analytic computing entity 65 may be performed for other utility usage data generated by other sensors, such as electricity usage data generated by current sensors, gas usage data generated by a fluid sensor for a gas supply line, and/or the like.

Upon receipt of the raw time series data, the analytic computing entity 65 may be configured to perform a Fast Fourier Transform (FFT) to generate converted frequency data within a frequency domain. The frequency data may be generated for discrete windowed subsets of data (e.g., subsets of data generated during discrete time windows) that may be provided in series so as to generate FFT data over time, which the analytic computing entity 65 is configured to map within a spectrogram as illustrated in the example illustration of FIG. 9A (and as reflected within Block 602 of FIG. 6). To facilitate identification of various events within the generated spectrogram, the analytic computing entity 65 may be configured to apply one or more smoothing algorithms to generate a smoothed spectrogram, to apply high-pass and/or low-pass filters to remove high or low frequencies signals from the data, and/or the like, such as that illustrated in FIG. 9B (illustrating a smoothed spectrogram of the data illustrated in FIG. 9A) and as illustrated at Block 603 of FIG. 6. Again, such processes for performing an FFT, generating a spectrogram and generating a smoothed spectrogram may be performed during both training processes and monitoring processes as discussed herein.

B. Event Detector Training

Figure 8:
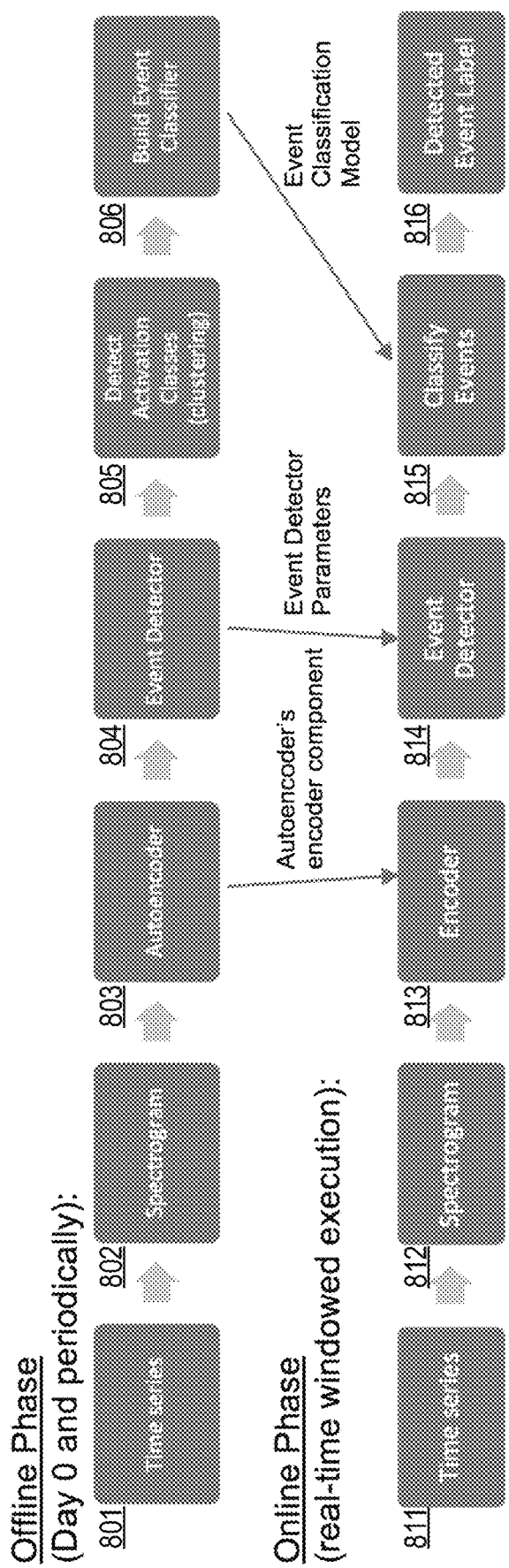
FIG. 8 encompasses example flowcharts illustrating functionality in an offline and online mode of certain embodiments.

Blocks 601-607 of FIG. 6 and Blocks 801-806 of FIG. 8 illustrate processes associated with an event detector training (or offline mode) configuration of certain embodiments. The event detector training configuration enables the analytic computing entity 65 to generate facility-specific algorithms through one or more machine-learning processes to accurately identify the occurrence of one or more events reflected within raw time series data generated by the one or more single point sensors. Accordingly, the analytic computing entity 65 is configured to generate and store facility specific algorithms for each of a variety of facilities 400 monitored via configurations discussed herein. Such facility specific algorithms may be generated in accordance with one or more unsupervised machine-learning configurations or supervised machine-learning configurations, as discussed herein. These facility-specific algorithms thereby enable highly accurate determinations of the occurrence of various discrete events and for classifying those discrete events, thereby enabling highly accurate monitoring of residents/occupants of the facility and their corresponding utility usage.

Moreover, the analytic computing entity 65 may be configured to perform various processes associated with event detector training utilizing a batch of raw time series data (e.g., generated over an extended period of time), thereby enabling analysis of a relatively large data set to be utilized as training data for generating appropriate algorithms and/or other methodologies to be utilized during real-time data analysis of the event detection configuration.

As discussed above in specific reference to FIG. 6, the analytic computing entity 65 of various embodiments operates based at least in part on raw time series data generated by one or more single point sensors that is provided to the analytic computing entity 65 as reflected at Block 601 of FIG. 6 and as additionally illustrated at Block 801 of FIG. 8. The analytic computing entity 65 is configured to extract frequency data from the raw time series data, for example, by performing an FFT analysis on the raw time series data. The FFT analysis may be performed for discrete windows of time having a defined duration (e.g., 100 milliseconds, 500 milliseconds, one second, 2 seconds, 3 seconds, and/or the like) so as to determine frequency data for small time periods that may be reassembled to provide time-series frequency data that may be utilized to construct a spectrogram, as indicated at Block 602 of FIG. 6 and Block 802 of FIG. 8. As a specific example related to usage of piezoelectric fluid sensors as discussed herein, the fluid sensors are configured to detect vibrations within a fluid supply pipe, and the analytic computing entity 65 is thus configured to determine the frequency of the detected vibrations and to reflect the frequency of the detected vibrations within a spectrogram. In certain embodiments, the analytic computing entity 65 may be configured to smooth the spectrogram data (e.g., by applying a smoothing algorithm to the spectrogram data) so as to more clearly define data indicative of the occurrence of discrete events. As discussed above, FIGS. 9A and 9B illustrate a spectrogram of example data and a smoothed spectrogram of the example data, respectively. The event detector training process may have a duration of one or more hours, one or more days, one or more weeks, and/or the like, so as to collect training data for analysis (e.g., by generating the smoothed spectrogram for all data within the training period, for example). The smoothed spectrogram of certain embodiments may thus reflect all data generated during the training period. In other embodiments, the training data may be expanded periodically (e.g., new training data may be generated periodically, even after beginning the monitoring of data in accordance with certain embodiments).

Figure 9A:
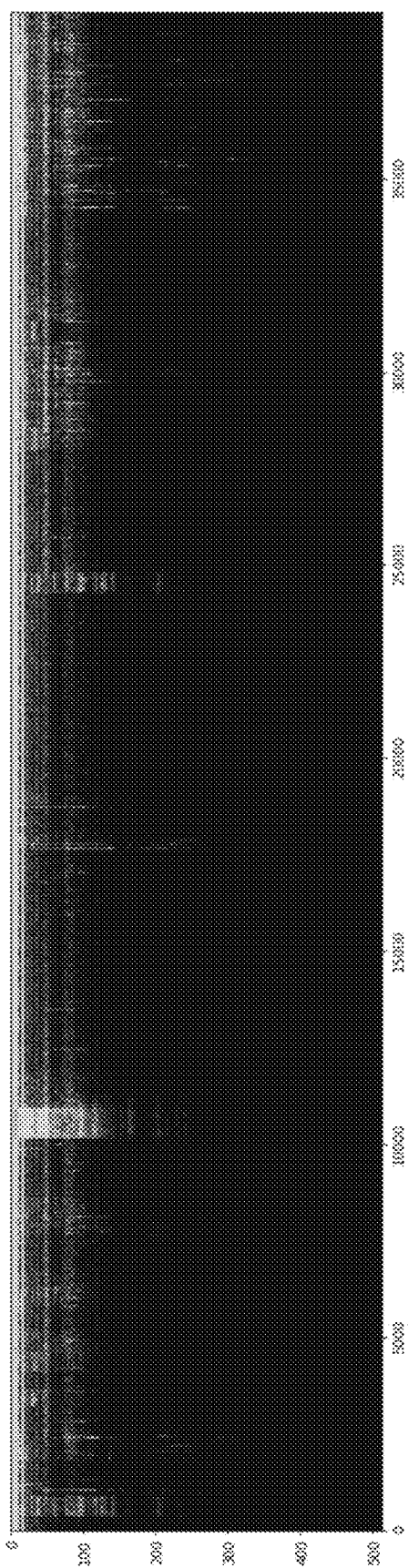
FIGS. 9A-9B illustrate example spectrograms generated based on frequency data extracted from time-series data in accordance with certain embodiments.
Figure 9B:
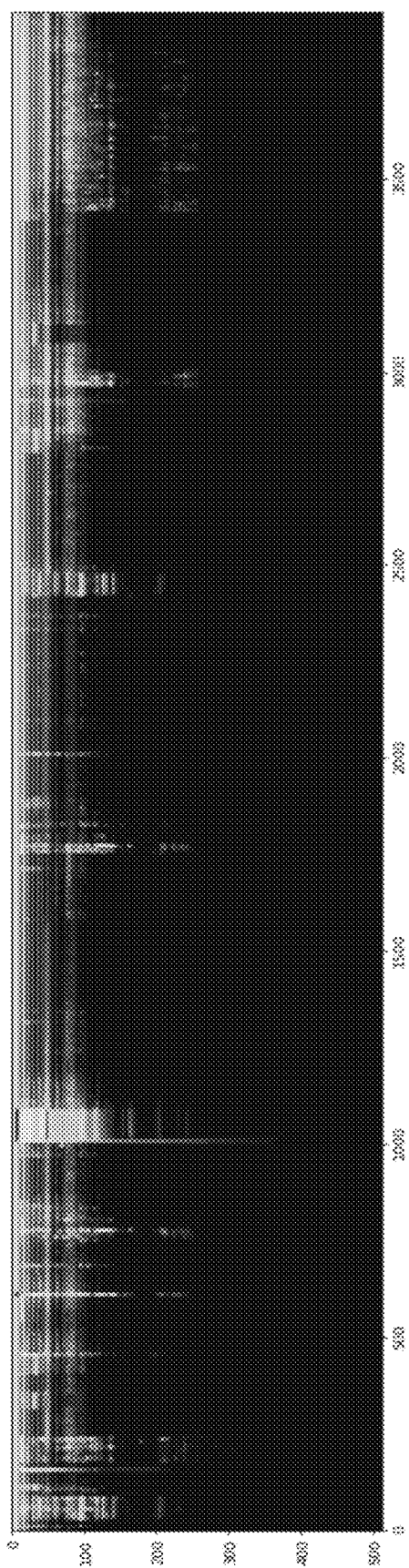
Figure 10A:
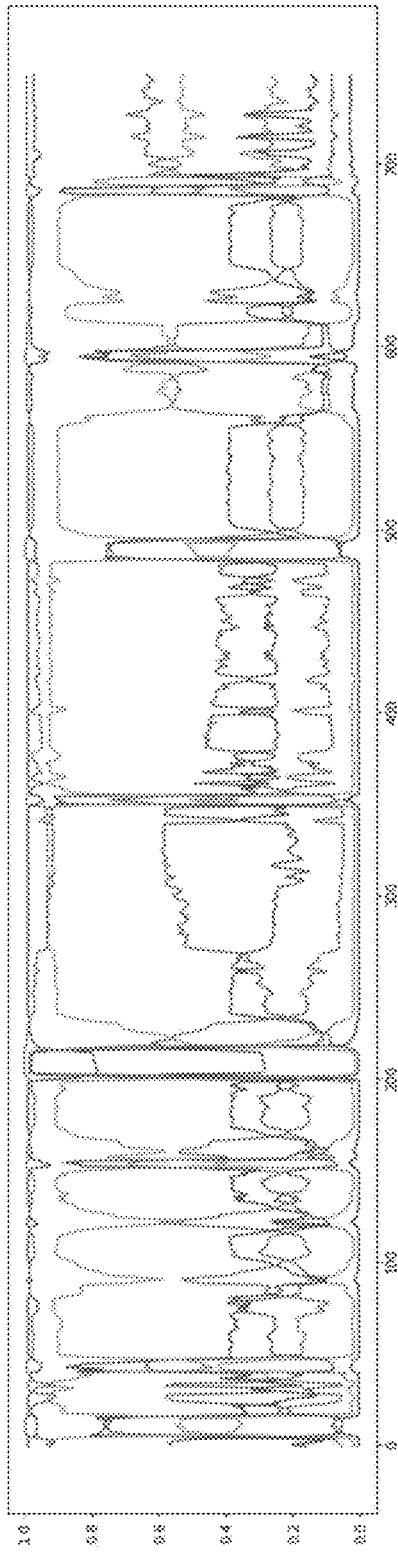
FIGS. 10A-10B illustrate example compressed vector representations of spectrograms in accordance with certain embodiments.
Figure 10B:
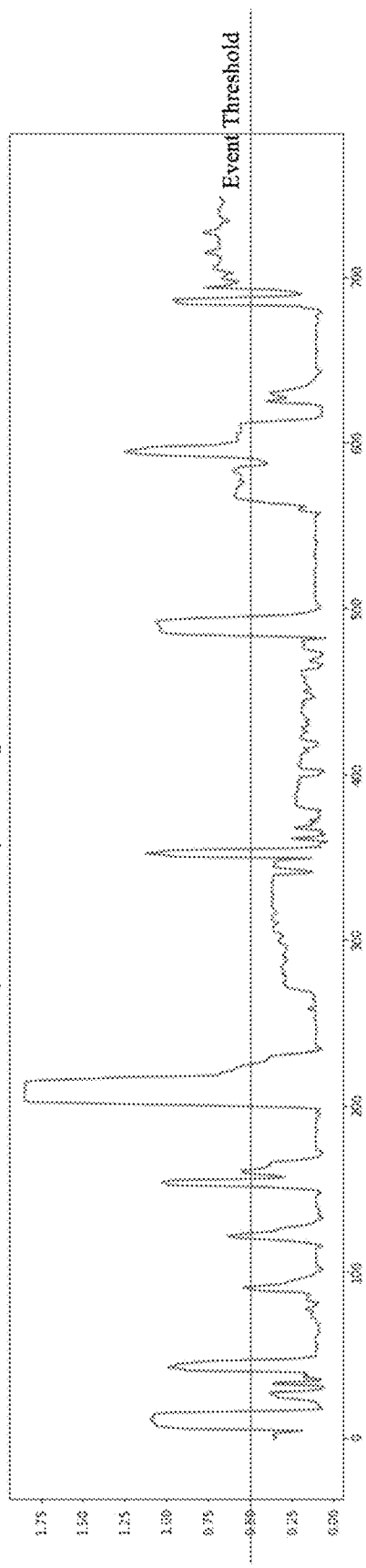

With reference to Block 604 of FIG. 6 and Block 803 of FIG. 8, the analytic computing entity 65 is configured to generate a compressed representation of the smoothed spectrogram. Specifically, the analytic computing entity 65 is configured to generate a vector representation of the smoothed spectrogram via an unsupervised neural network for providing an autoencoder based at least in part on the training data. An example compressed vector representation of the smoothed spectrogram data of FIG. 9B is illustrated in FIG. 10A. The neural network may be configured to generate an autoencoder configuration for representing the spectrogram data in compressed form while maintaining a high level of detail representative of the smoothed spectrogram, based at least in part on a reconstruction of the spectrogram data via a corresponding decoder. Any of a variety of autoencoder configurations may be utilized, including denoising autoencoders, sparse autoencoders, sequential autoencoders and convolutional autoencoders.

Utilizing the generated autoencoder neural network, the analytic computing entity 65 is configured to generate an event detector algorithm as reflected within Block 605 of FIG. 6 (e.g., via one or more defined rules to be applied utilizing the vector representation of the spectrogram data). As just one example, the analytic computing entity 65 is configured to generate an event detector algorithm based at least in part on detected differences between a vector representation of specific data and a median vector representation of the spectrogram data. The median vector representation of the spectrogram data may be utilized to approximate background noise within signals generated by the single point utility sensor. A graphical illustration of such data is reflected in FIG. 10B, which illustrates the difference between a compressed vector representation of data and the median vector representation of the data. In such embodiments, for example, the analytic computing entity 65 may be configured to automatically identify an appropriate threshold difference between a vector representation of data and a median vector representation of the data to be indicative of the occurrence of a discrete event. Events (e.g., representative of discrete periods of usage of various fixtures, representative of discrete periods of deactivation of various fixtures, and/or the like) may be identified as corresponding with elevated Euclidian (or Manhattan, Cosine, and/or the like) distance between the vector representation at a point in time and the median vector, and the median vector may be calculated based at least in part on an extended data set (e.g., generated over an extended time period such as over a day, a week, a month, and/or the like).

As yet another example, the analytic computing entity 65 may be configured to identify a reconstruction error associated with compressed data (e.g., determined based at least in part by reconstructing the spectrogram utilizing the decoder), and to automatically determine a threshold reconstruction error indicative of the occurrence of a discrete event. It should be understood that other rules may be utilized by the analytic computing entity 65 to generate an event detection algorithm specific to a particular facility 400 based at least in part on raw time series data generated during an event detector training configuration as discussed herein.

Moreover, utilizing events detected within the training data generated during the event detector training configuration, the analytic computing entity 65 is configured to utilize one or more machine-learning configurations to generate a classification algorithm for identified discrete events, thereby enabling the analytic computing entity to distinguish between different event types, as reflected in Block 606 of FIG. 6 and Blocks 805-806 of FIG. 8. The classification algorithm may be generated via unsupervised machine-learning techniques such as K-means clustering, DBSCAN, expectation maximization, and/or the like. At least in part because such clustering algorithms are generated automatically (and via unsupervised machine-learning techniques), the analytic computing entity 65 of certain embodiments does not assign human-recognizable labels to the data (e.g., so as to identify a specific event as a toilet flush). Instead, the classification process may proceed purely by distinguishing between different event types (e.g., event type A is different from event type B, but the analytic computing entity 65 does not identify what event type A or event type B represents). Utilizing the machine-learning clustering configuration, the analytic computing entity 65 is configured to generate an event classifier algorithm (as specifically represented within Block 607 of FIG. 6 and Block 806 of FIG. 8) that may be utilized during the monitoring configuration discussed herein to classify detected events represented within collected raw time series data.

Although discussed above specifically in reference to usage of unsupervised machine-learning techniques for classifying events, it should be understood that other embodiments may utilize supervised machine-learning techniques, thereby enabling further clustering between discretely identified event types that are identified via supervised training data as analogous events (e.g., a master bathroom sink event and a guest bathroom sink event may be commonly categorized).

Based at least in part on the detected event classifications, the analytic computing entity 65 constructs an event classifier usable within an event detection configuration (online mode), such as in real-time, for classifying events detectable within signal data of the utility sensor. The event classifier may comprise any of a variety of machine-learning techniques to generate such as event classifier, such as logistic regression, support vector machines, dense/recurrent/convolutional neural networks, discriminant analysis, density gaussian mixture models, and/or the like. Such classifiers are thus capable of classifying detected events, such as in real-time, based at least in part on characteristics of a signal analyzed by the event classifier.

In accordance with various embodiments, the analytic computing entity 65 is configured to separate the process for generating and/or updating facility specific algorithms and for utilizing the generated algorithms for monitoring utility usage within the facility. Specifically, raw time series data collected during the event detector training period is not utilized for monitoring utility usage, and raw time series data collected during event detection periods is not utilized for modifying facility specific algorithms. However, as discussed herein, the analytic computing entity 65 may be configured to alternate (e.g., based at least in part on user input and/or automatically) between event detection time periods and event detector training periods, so as to periodically update the facility specific algorithms and maintain the relevance of the facility specific algorithms over time (e.g., so as to ensure that the facility specific algorithms reflect vibration signatures attributable to newly installed fixtures, changes in the person residing within/occupying the facility, and/or the like.

C. Event Detection

Blocks 608-614 of FIG. 6 and Blocks 811-816 of FIG. 8 illustrate various steps involved in monitoring events reflected within raw time series data generated by a single point sensor of a facility 400 in accordance with certain embodiments. As discussed above and as reflected in Block 608 of FIG. 6 and Block 811 of FIG. 8, the analytic computing entity 65 receives raw time series data generated by the one or more utility sensors (e.g., a single fluid sensor for the facility 400).

As indicated at Blocks 609-610 of FIG. 6 and Block 812 of FIG. 8, the analytic computing entity 65 generates frequency data (e.g., via the FFT process discussed above), plots the frequency data onto a spectrogram (e.g., by plotting FFT data generated for discrete windowed time periods along a time axis of the spectrogram), and the analytic computing entity 65 executes a smoothing algorithm to generate a smoothed spectrogram for further analysis.

The analytic computing entity 65 applies the encoder of the autoencoder generated during the event detector training period to generate a compressed vector representation of the spectrogram, as illustrated at Block 611 of FIG. 6 and Block 813 of FIG. 8. The analytic computing entity 65 then applies the event detection algorithm generated during the event detector training period to detect discrete events within vector representation of the spectrogram data, as reflected at Block 612 of FIG. 6 and Block 814 of FIG. 8. For example, the event detection algorithm may be configured to cause the analytic computing entity 65 to identify a median vector representation of the spectrogram data, and to identify differences between the compressed spectrogram data (representing a particular period of time) and the median vector representation. A determination that the difference between the compressed spectrogram data and the median vector representation satisfies one or more event detection criteria (e.g., the difference exceeds a defined threshold), the analytic computing entity is configured to indicate that an event has been detected. As discussed above, other methodologies may be utilized for detecting events, such as utilizing both an encoder and a decoder to determine a reconstruction error associated with the compressed vector representation of the spectrogram, and to identify events based at least in part upon a determination that the reconstruction error satisfies a defined criteria (e.g., a value indicative of the reconstruction error exceeds a defined threshold).

In certain embodiments, upon detecting discrete events, the analytic computing entity 65 may define an event start time and an event stop time based at least in part on the application of the event detection algorithm, thereby enabling the analytic computing entity 65 to define the start and stop times of events within the raw time series data, for example, for further analysis within the time domain, if needed.

Once discrete events have been identified, the analytic computing entity 65 applies the clustering and/or event classification algorithms generated during the event detector training period to monitor and classify (e.g., by predicting classifications) each of the identified discrete events as reflected in Block 613 of FIG. 6 and Blocks 815-816 of FIG. 8. The clustering algorithms of certain embodiments are provided to identify distinct event types based on characteristics of the detected signals and/or to provide cluster-specific labels to each identified discrete event. The clustering algorithms and the classification algorithms may be further configured to apply unique labels to detected events falling into defined clusters (although such labels may not be human-readable labels and/or may not provide descriptive labels of the events encompassed by the cluster). The labels of the clustering algorithms may be utilized and/or otherwise provided to a classification algorithm that is trained to recognize the discrete event types identified by the clustering algorithms. As discussed above, the classification algorithm may be generated automatically, without user input, and accordingly the classifications may enable distinctions between different event types, however the classifications may not be identifiable as specific events recognizable by humans. For example, the classification may distinguish between different event types without classifying one event type as an "upstairs shower on" and another event type as "kitchen faucet on." However, it should be understood that in certain embodiments, the analytic computing entity 65 may be configured to receive user input providing human-identifiable labels that may be applicable to specific event types (such that specific events may be given human-readable labels that are descriptive of the events occurring), thereby enabling additional human-performed analysis of events occurring within time series data.

D. Resident Monitoring

As mentioned, various embodiments are configured for ambient monitoring of one or more residents/occupants of a facility, for example, so as to monitor the residents'/occupants' cognitive health based at least in part on detecting changes in those residents'/occupants' behaviors. By specifically monitoring the usage of particular fixtures within the facility (e.g., fluid-based fixtures and/or electrical fixtures) via single-point sensing over time, various embodiments may identify a typical pattern of fixture usage by occupants/residents of a facility, such that changes in patterns of fixture usage may be identified over time.

In other embodiments, ambient monitoring of fixture usage in accordance with the configurations discussed above may be utilized to provide reminders to a resident/occupant of the facility to perform various tasks, and those reminders may be sent based on an estimated location of the resident/occupant, as determined based on the current activities of the resident/occupant, and/or the like. As a non-limiting example, the analytic computing entity 65 may operate independently or in association with one or more additional computing entities to provide reminders to a user computing entity 30 associated with a resident of a facility to floss upon detecting a fixture event indicating the resident/occupant is located within a master bathroom. It should be understood that certain notification configurations may reference a plurality of rules to customize when a notification should be provided to the resident/occupant (e.g., notifications to floss should be sent upon detecting the master bathroom faucet turning on and the current time being between 5 AM-7:30 AM).

In certain embodiments, data indicative of the classified identified events, as well as additional data generated in association with such events (e.g., start/stop data generated as discussed above) may be utilized for monitoring the activities of individuals residing or otherwise occupying the facility. Over time, the analytic computing entity 65 may be configured to recognize a typical pattern of events (e.g., via machine-learning algorithms), thereby enabling the analytic computing entity 65 to detect deviations from the typical pattern of events—whether those deviations are sudden or gradual. As an example, the analytic computing entity 65 may detect that fixture A turns on between 6:00 AM-6:15 AM Monday-Friday (fixture A being a master bathroom sink), then fixture B turns on between 6:22 AM-6:31 AM Monday-Friday (fixture B being a kitchen sink), and then fixture C turns on between 6:50 AM-7:20 AM (fixture C being a master shower). Additional data may be identified for typical usages of fixtures at other times/days of the week.

The analytic computing entity 65 may constantly monitor fixture activity based on raw time-series data generated by a single-point sensor, in accordance with the configurations discussed above, and upon detecting changes in fixture activity, the analytic computing entity 65 may provide a notification to one or more individuals (e.g., care providers of the occupant/resident of the facility 400) of potential behavior changes of the occupant/resident of the facility 400. In certain embodiments, notifications may be provided only upon determining that the changes in fixture activity satisfies one or more criteria, which may be stored in association with the analytic computing entity 65 and applied for a plurality of facilities 400. For example, the analytic computing entity 65 may be configured to generate a notification upon determining that fixture usage changes from a highly regular schedule of fixture usage to an at least moderately unpredictable schedule of fixture usage. Such embodiments may ensure that false positives are not generated when a resident/occupant of the facility merely changes his/her schedule (e.g., due to a new job), but remains regular in fixture usage.

Such embodiments may be configured to recognize symptoms of cognitive health decline in the resident/occupant of facility 400 during normal activities of the patient through ambient monitoring. The patient thus need not visit a healthcare physician for diagnosis of potential cognitive healthcare decline, which may result is early detection of even subtle symptoms that may enable early intervention to address health issues leading to the cognitive decline of the resident/occupant.

Accordingly, through the recognition of changes in typical patterns of events within the data collected by the single point sensors as discussed herein, the analytic computing entity 65 may be configured to identify patterns of events that are indicative of potential cognitive decline and/or other medical conditions of the resident/occupant of the facility 400. The analytic computing entity 65 may thus generate and/or otherwise provide alerts to one or more users, such as caretakers associated with the resident/occupant (e.g., by providing notifications to a user computing entity 30 associated with a caretaker of the resident/occupant) and/or the resident/occupant himself/herself (e.g., by providing notifications to a user computing entity 30 associated with the resident/occupant), as reflected at Blocks 613-614 of FIG. 6.

In certain embodiments, particularly those embodiments assigning human-understandable labels to events detected within the signals generated by the utility sensor, the analytic computing entity 65 may interface with one or more additional computing entities (or utilize additional features executable by the analytic computing entity 65) to correlate detected events with one or more standards for determining the resident's/occupant's ability to live independently. To assign such human readable labels, various embodiments may interface with a computing entity (e.g., by providing a notification to a user computing entity associated with a resident/occupant of the monitored facility) in real-time or near real-time upon detecting an event, and providing a user-interactive prompt requesting information as to the type of event that was detected. The user may thus provide human-readable labels in real-time that may be correlated with particular detected events so as to populate human-readable labels for use with a particular facility. In other embodiments, various embodiments may assign human readable labels by providing a user with a time-line based interactive user interface that provides times of detected events throughout a defined time period (e.g., one day, one hour, and/or the like), and requests that the user provide user input including human-readable labels identifying the event occurring at each of a plurality of the displayed events within the timeline. Such timeline need not be provided in real-time, and may be provided after one or more events occurred. As just one example, various events may be correlated with attributes of an Activities of Daily Living (ADL) standard that may provide a score or other indication of the ability of an individual to live independently, based at least in part on data indicative of activities performed independently by the occupant/resident of the facility 400.

V. CONCLUSION

Many modifications and other embodiments will come to mind to one skilled in the art to which this disclosure pertains having the benefit of the teachings presented in the foregoing descriptions and the associated drawings. There- That which is claimed:

1. A system for detecting utility usage and distinguishing between utility fixtures within a facility, the system comprising:
  at least one utility sensor secured to a utility supply line of a facility, wherein the at least one utility sensor is configured to generate time-series data based at least in part on detected utility usage; and
  an analytic computing entity in network communication with the at least one utility sensor, wherein the analytic computing entity comprises one or more memory storage areas and one or more processors collectively configured to:
    transform at least a portion of the time-series data generated by the at least one utility sensor into converted data in a frequency domain;
    compress the converted data into vector form via a neural network compression algorithm;
    detect discrete utility usage events within the vector form utilizing an event detection algorithm;
    cluster discrete utility usage events to generate labels for detected utility usage events; and
    train one or more machine-learning classifier algorithms based at least in part on clustered discrete utility usage events to classify utility usage events by a plurality of fixtures.

2. The system for detecting utility usage and distinguishing between utility fixtures within a facility of claim 1, wherein the at least one utility sensor is embodied as a single point fluid sensor secured to an exterior surface of a fluid supply line for the facility.

3. The system for detecting utility usage and distinguishing between utility fixtures within a facility of claim 2, wherein the single point fluid sensor is embodied as a piezoelectric sensor.

4. The system for detecting utility usage and distinguishing between utility fixtures within a facility of claim 1, wherein the analytic computing entity is configured to change between an event detector training configuration and an event detection configuration, and wherein:
  the event detector training configuration comprises processes for:
    transforming the at least a portion of the time-series data generated by the at least one utility sensor into the converted data in the frequency domain;
    compressing the converted data into vector form via the neural network compression algorithm;
    detecting the discrete utility usage events within the vector form utilizing the event detection algorithm;
    generating a clustering algorithm to cluster discrete utility usage events and to generate labels for detected utility usage events; and
    training the one or more machine-learning classifier algorithms based at least in part on the clustered discrete utility usage events to classify and distinguish between utility usage by the plurality of fixtures; and
  the event detection configuration comprises processes for:
    transforming at least a portion of second time-series data generated by the at least one utility sensor into second converted data in the frequency domain;
    applying the neural-network compression algorithm to compress the second converted data into vector form;
    detecting discrete utility usage events within the vector form utilizing the event detection algorithm; and
    applying the clustering algorithm and the one or more machine-learning classifier algorithms to classify and distinguish between utility usage by the plurality of fixtures.

5. The system for detecting utility usage and distinguishing between utility fixtures within a facility of claim 1, wherein the one or more processors are further configured to train a machine-learning algorithm for monitoring fixture usage events over time and to detect deviations in fixture usage.

6. The system for detecting utility usage and distinguishing between utility fixtures within a facility of claim 1, wherein the at least one utility sensor is embodied as a single point electric current sensor secured in-line with a facility electricity supply line.

7. The system for detecting utility usage and distinguishing between utility fixtures within a facility of claim 1, wherein transforming at least a portion of the time-series data generated by the at least one utility sensor into converted data in a frequency domain comprises:
  generating a spectrogram based at least in part on the converted data; and
  smoothing the spectrogram utilizing a smoothing algorithm.

8. A computer-implemented method for detecting utility usage and distinguishing between utility fixtures within a facility, the method comprising:
  receiving, via at least one processor, time-series data generated based at least in part on utility usage detected by at least one utility sensor secured to a utility line of a facility;
  transforming, via the at least one processor, at least a portion of the time-series data generated by the at least one utility sensor into converted data in a frequency domain;
  compressing, via the at least one processor, the converted data into vector form via a neural network compression algorithm;
  detecting, via the at least one processor, discrete utility usage events within the vector form utilizing an event detection algorithm;
  clustering, via the at least one processor, discrete utility usage events to generate labels for detected utility usage events; and
  training, via the at least one processor, one or more machine-learning classifier algorithms based at least in part on clustered discrete utility usage events to classify utility usage events by a plurality of fixtures.

9. The computer-implemented method of claim 8, wherein the at least one utility sensor is embodied as a piezoelectric single point fluid sensor secured to an exterior surface of a fluid supply line for the facility.

10. The computer-implemented method of claim 8, further comprising: changing between an event detector training configuration and an event detection configuration, and wherein:
  the event detector training configuration comprises processes for:

transforming the at least a portion of the time-series data generated by the at least one utility sensor into the converted data in the frequency domain;

compressing the converted data into vector form via the neural network compression algorithm;

detecting the discrete utility usage events within the vector form utilizing the event detection algorithm; and generating a clustering algorithm to cluster discrete utility usage events and to generate labels for detected utility usage events; and training the one or more machine-learning classifier algorithms based at least in part on the clustered discrete utility usage events to classify and distinguish between utility usage by the plurality of fixtures; and the event detection configuration comprises processes for:

transforming at least a portion of second time-series data generated by the at least one utility sensor into second converted data in the frequency domain;

applying the neural-network compression algorithm to compress the second converted data into vector form;

detecting discrete utility usage events within the vector form utilizing the event detection algorithm; and applying the clustering algorithm and the one or more machine-learning classifier algorithms to classify and distinguish between utility usage by the plurality of fixtures.

11. The computer-implemented method of claim 8, further comprising training a machine-learning algorithm for monitoring fixture usage events over time and to detect deviations in fixture usage.

12. The computer-implemented method of claim 8, wherein the at least one utility sensor is embodied as a single point electric current sensor secured in-line with a facility electricity supply line.

13. The computer-implemented method of claim 8, wherein transforming at least a portion of the time-series data generated by the at least one utility sensor into converted data in a frequency domain comprises:

generating a spectrogram based at least in part on the converted data; and smoothing the spectrogram utilizing a smoothing algorithm.

14. A computer program product comprising a non-transitory computer readable medium having computer program instructions stored therein, the computer program instructions when executed by a processor, cause the processor to:

receive time-series data generated based at least in part on utility usage detected by at least one utility sensor secured to a utility line of a facility;

transform at least a portion of the time-series data generated by the at least one utility sensor into converted data in a frequency domain;

compress the converted data into vector form via a neural network compression algorithm;

detect discrete utility usage events within the vector form utilizing an event detection algorithm;

cluster discrete utility usage events to generate labels for detected utility usage events; and train one or more machine-learning classifier algorithms based at least in part on clustered discrete utility usage events to classify utility usage events by a plurality of fixtures.

15. The computer program product of claim 14, wherein the at least one utility sensor is embodied as a piezoelectric single point fluid sensor secured to an exterior surface of a fluid supply line for the facility.

16. The computer program product of claim 14, further comprising computer program instructions configured to cause the processor to change between an event detector training configuration and an event detection configuration, and wherein:

the event detector training configuration comprises processes for:

transforming the at least a portion of the time-series data generated by the at least one utility sensor into the converted data in the frequency domain;

compressing the converted data into vector form via the neural network compression algorithm;

detecting the discrete utility usage events within the vector form utilizing the event detection algorithm; and generating a clustering algorithm to cluster discrete utility usage events and to generate labels for detected utility usage events; and training the one or more machine-learning classifier algorithms based at least in part on the clustered discrete utility usage events to classify and distinguish between utility usage by the plurality of fixtures; and the event detection configuration comprises processes for:

transforming at least a portion of second time-series data generated by the at least one utility sensor into second converted data in the frequency domain;

applying the neural-network compression algorithm to compress the second converted data into vector form;

detecting discrete utility usage events within the vector form utilizing the event detection algorithm; and applying the clustering algorithm and the one or more machine-learning classifier algorithms to classify and distinguish between utility usage by the plurality of fixtures.

17. The computer program product of claim 14, further comprising computer program instructions configured to cause the processor to train a machine-learning algorithm for monitoring fixture usage events over time and to detect deviations in fixture usage.

18. The computer program product of claim 14, wherein the at least one utility sensor is embodied as a single point electric current sensor secured in-line with a facility electricity supply line.

19. The computer program product of claim 14, wherein transforming at least a portion of the time-series data generated by the at least one utility sensor into converted data in a frequency domain comprises:

generating a spectrogram based at least in part on the converted data; and smoothing the spectrogram utilizing a smoothing algorithm.

* * * * *